United States Patent [19]
Sekizaki et al.

[11] Patent Number: 4,534,440
[45] Date of Patent: Aug. 13, 1985

[54] APPARATUS FOR ATTACHING TRANSMISSION CASING AND BRAKE CASING IN MOTORIZED THREE-WHEELED VEHICLE

[75] Inventors: Satoshi Sekizaki, Toyama; Eiji Hosoya, Asaka; Hotoyuki Takasu, Tokyo, all of Japan

[73] Assignee: Honda Giken Kogyo Kabushiki Kaisha, Tokyo, Japan

[21] Appl. No.: 550,674

[22] Filed: Nov. 10, 1983

[30] Foreign Application Priority Data

Nov. 10, 1982 [JP] Japan ................ 57-196086

[51] Int. Cl.³ .............................. B62K 5/04
[52] U.S. Cl. ...................... 180/215; 180/88
[58] Field of Search ............. 180/215, 88, 62, 226; 188/18 R, 344

[56] References Cited

U.S. PATENT DOCUMENTS 2,077,628  4/1937  Jordan ................. 180/226
2,156,412  5/1939  Tingle ................. 180/226
4,325,449  4/1982  D'Addio et al. ....... 180/215

FOREIGN PATENT DOCUMENTS 805119    5/1951  Fed. Rep. of Germany ...... 180/226
55-178468 12/1980 Japan .
55-178486 12/1980 Japan .
56-152790 11/1981 Japan .
    1561 of 1907 United Kingdom ............... 180/88

Primary Examiner—Joseph F. Peters, Jr.
Assistant Examiner—Ross Weaver
Attorney, Agent, or Firm—Armstrong, Nikaido, Marmelstein & Kubovcik

[57] ABSTRACT

An apparatus for attaching a transmission casing and a brake casing in a motorized three-wheeled vehicle having a rear wheel axle interconnecting between a pair of right and left rear wheels, and a transmission casing housing a final stage driving mechanism and a brake casing housing a brake mechanism provided around the axis of the axle, characterized in that the transmission casing and the brake casing are composed of respective sealed casings, and the two casings are disposed side by side leaving a space therebetween, and are combined together at circumferentially arranged plural positions with plural fastening bolts. The two casings are fixed to a vehicle body of the motorized three-wheeled vehicle by utilizing at least one of fastening bolts for combining the two casings together.

4 Claims, 5 Drawing Figures

4,534,440

APPARATUS FOR ATTACHING TRANSMISSION CASING AND BRAKE CASING IN MOTORIZED THREE-WHEELED VEHICLE

BACKGROUND OF THE INVENTION

This invention relates to an apparatus for attaching a transmission casing and a brake casing in a motorized three-wheeled vehicle having two rear wheels.

Motorized three-wheeled vehicles are known having a rear wheel axle interconnecting a pair of right and left rear wheels. The rear axle is provided around the axis thereof with a transmission casing housing a final stage driving mechanism and a brake casing housing a brake mechanism. It has been usual that the two casings are disposed on the right and the left apart from one another and are individually fixed to a vehicle body.

This type of arrangement, however, is disadvantageous in assembling the vehicle. It is desirable that the assembly be improved by forming the two casings into an integral one. If, however, the two casings are simply formed into an integral one, heat generated at the brake mechanism is liable to be transmitted to the final stage driving mechanism to deteriorate the lubrication thereof. Therefore, it is desirable that heat transmission as above may be prevented and that cooling of each of those mechanisms may not be decreased.

This invention has for its object to provide an apparatus meeting those desires. That is, it is an object of the present invention to provide an assembly wherein heat transmission from a brake casing to the final stage driving mechanism be minimized while providing as compact a unit as possible.

The present invention is an apparatus having a rear wheel axle interconnecting between a pair of right and left rear wheels and being provided around the axis thereof with a transmission casing housing a final stage driving mechanism and a brake casing housing a brake mechanism, characterized in that the transmission casing and the brake casing are composed of respective sealed casings, and the two casings are disposed side by side to leave a space therebetween, and are combined together at plural positions at circumferentially arranged plural positions.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
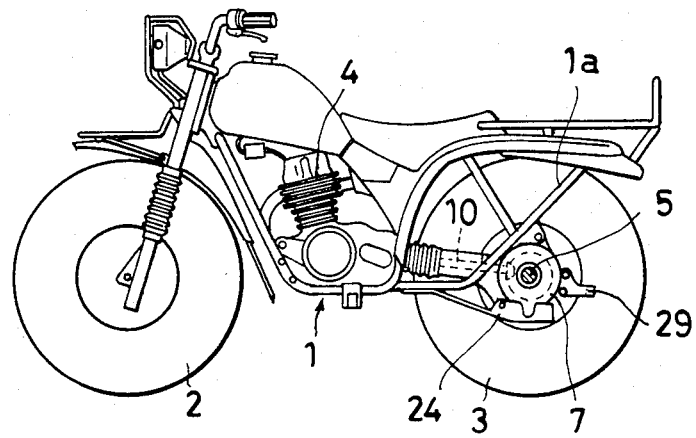
FIG. 1 is a side view of one example of a motorized three-wheeled vehicle having one embodiment of this invention.
Figure 2:
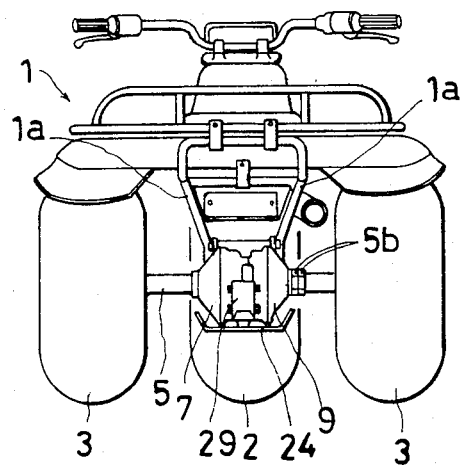
FIG. 2 is a rear view thereof.

One embodying example of this invention will now be explained with reference to the accompanying drawings:

Referring to the drawings as shown in FIGS. 1 and 2, a vehicle body 1 is provided with a single front wheel 2 and a pair of right and left rear wheels 3, 3. The body 1 additionally provided at its middle portion with an internal combustion engine 4 mounted thereon. Each of these wheels 2, 3, 3 comprises a rim having a balloon tire. The vehicle body 1 is thus formed as a whole into a motorized three-wheeled vehicle for off-road driving.

Figure 5:
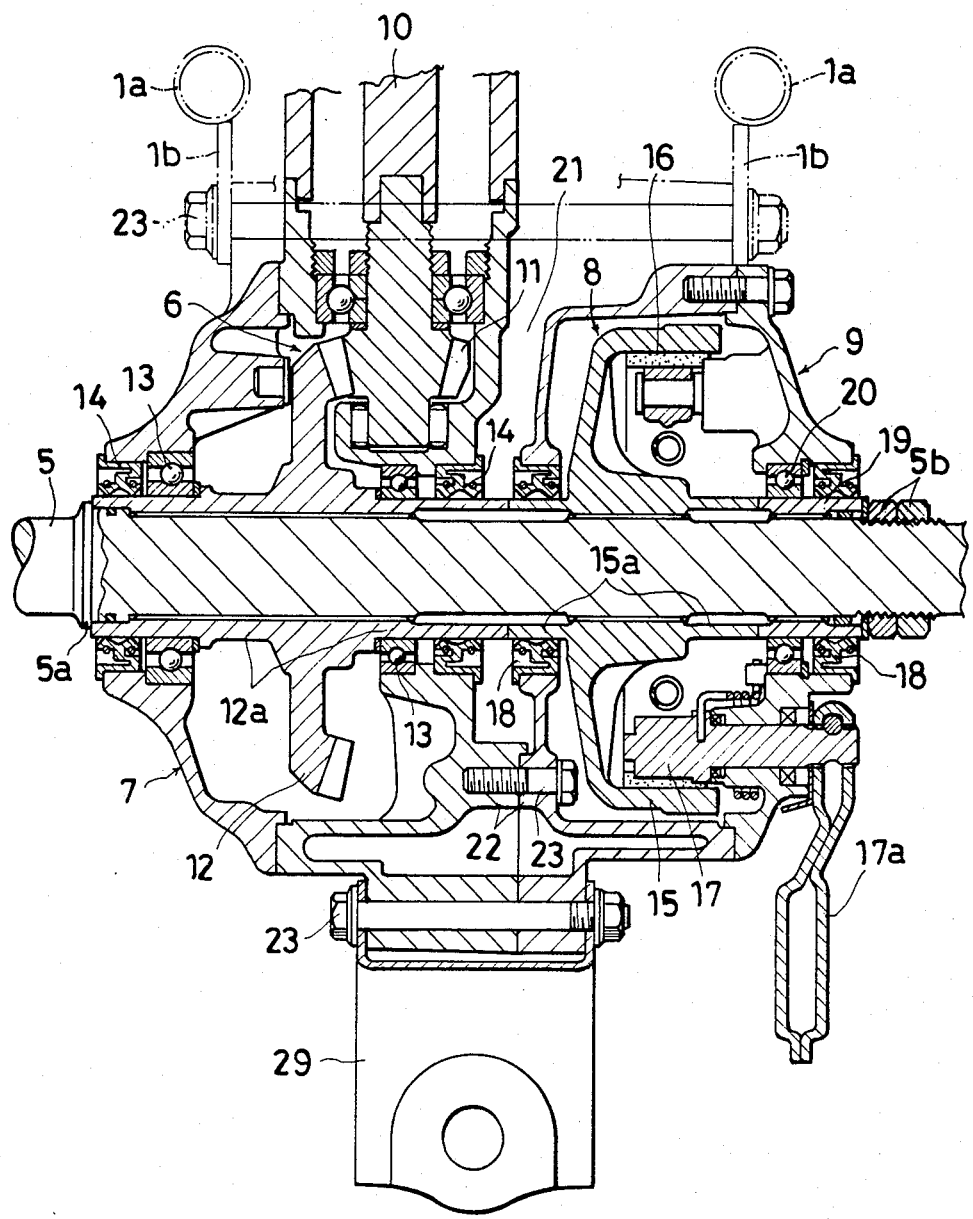
FIG. 5 is a sectional view taken along the line V-V in FIG. 3.

A rear wheel axle 5 interconnecting between the two rear wheels 3, 3, is provided around the axis thereof with a transmission casing 7 housing a final stage driving mechanism 6 and a brake casing 9 housing a brake mechanism 8. As shown clearly in FIG. 5, the driving mechanism 6 comprises a bevel gear mechanism composed of a pinion gear 11 connected through a propeller shaft 10 to the engine 4, and a bevel gear 12 which is meshed with the gear 11 and is in spline engagement with the rear wheel axle 5. The transmission casing 7 is formed as a sealed unit having a pair of right and left bearings 13, 13 for supporting the bevel gear 12 through spline sleeves 12a, 12a projecting from the bevel gear 12, and a pair of right and left oil seals 14, 14 disposed on both outsides of the bearings 13, 13. Lubrication oil is contained therein.

The brake mechanism 8 comprises a drum type brake mechanism composed of a brake drum 15 which is in spline engagement with the rear wheel axle 5, brake shoes 16 arranged to be brought into internal contact with the drum 15, and a brake cam 17 for expanding the shoes 16. The brake casing 9 is formed as a sealed unit having a dust seal 18 which is provided on one side of the casing 9 and serves to support the brake drum 15 through a sleeve 15a extending from one side of the drum 15, a bearing 20 which is provided on the other side thereof and serves to support a collar 19 which is positioned in abutment with a sleeve 15a extending from the other side of the drum 15, and a dust seal 18 provided on the outside of the bearing 20. A shaft portion of the cam 17 is protruded outside of the casing to pass through an outward wall of the brake casing 9. A lever 17a to which a brake wire (not illustrated) is connected, is attached to the shaft portion of the cam 17.

According to this invention, the transmission casing 7 and the brake casing 9 are so disposed side by side as to leave a space 21 formed therebetween, and are combined together at circumferentially disposed plural positions.

More in detail, the transmission casing 7 and the brake casing 9 are provided at their mutually facing side wall portions with plural abutment portions 22, 22 ... formed at circumferentially arranged plural positions. The two casings 7, 9 are combined together at each of these abutment portions 22, 22, ... by means of a fastening bolt 23 so as to form the space 21 therebetween.

Additionally, the two casings 7, 9 are fixed, at each of two upper and lower positions thereof, to a pair of right and left brackets 1b, 1b fixedly provided on a pair of right and left rear frame pipes 1a, 1a of the vehicle 1, by means of the foregoing fastening bolt 23.

Figure 3:
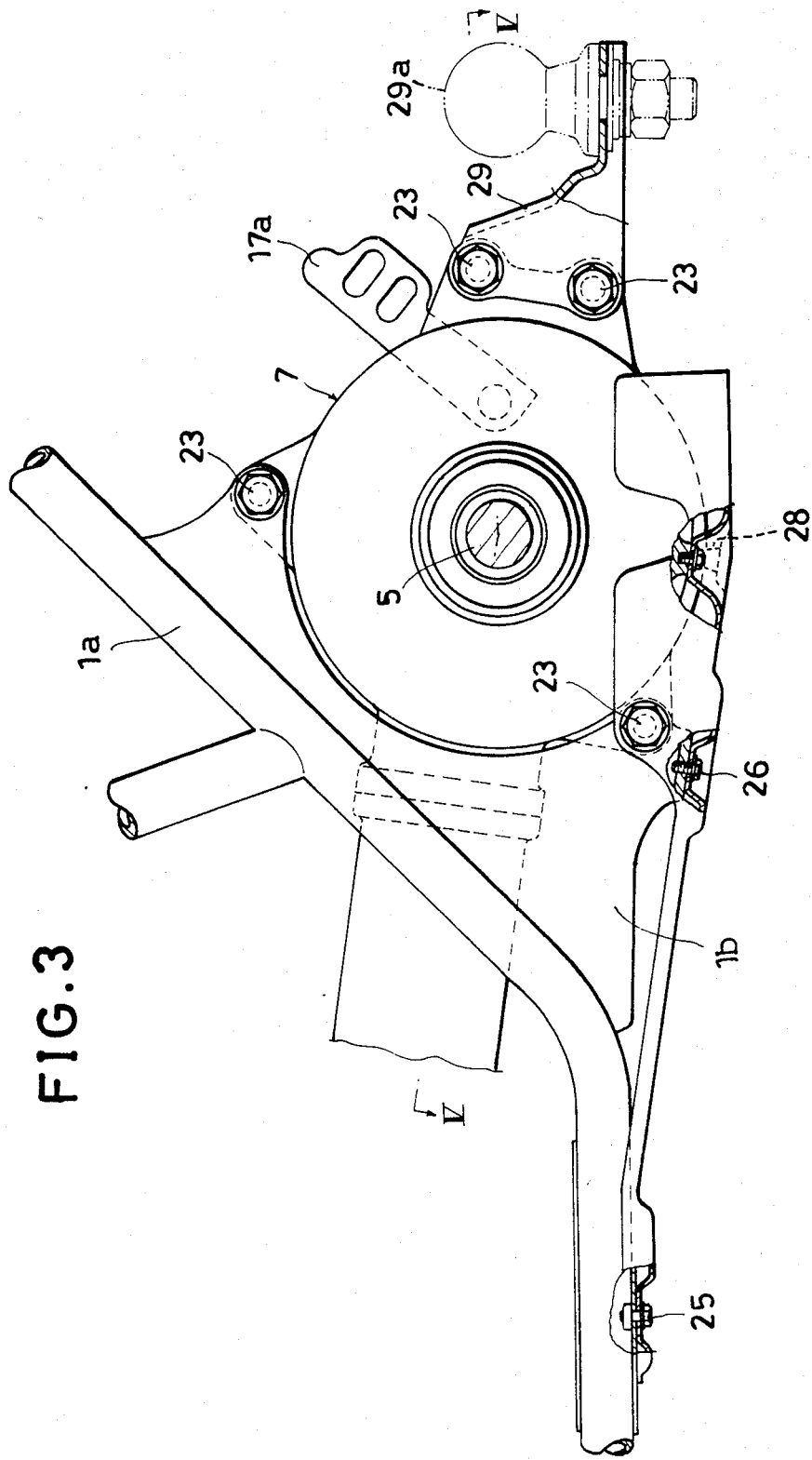
FIG. 3 is an enlarged side view of an important portion thereof.
Figure 4:
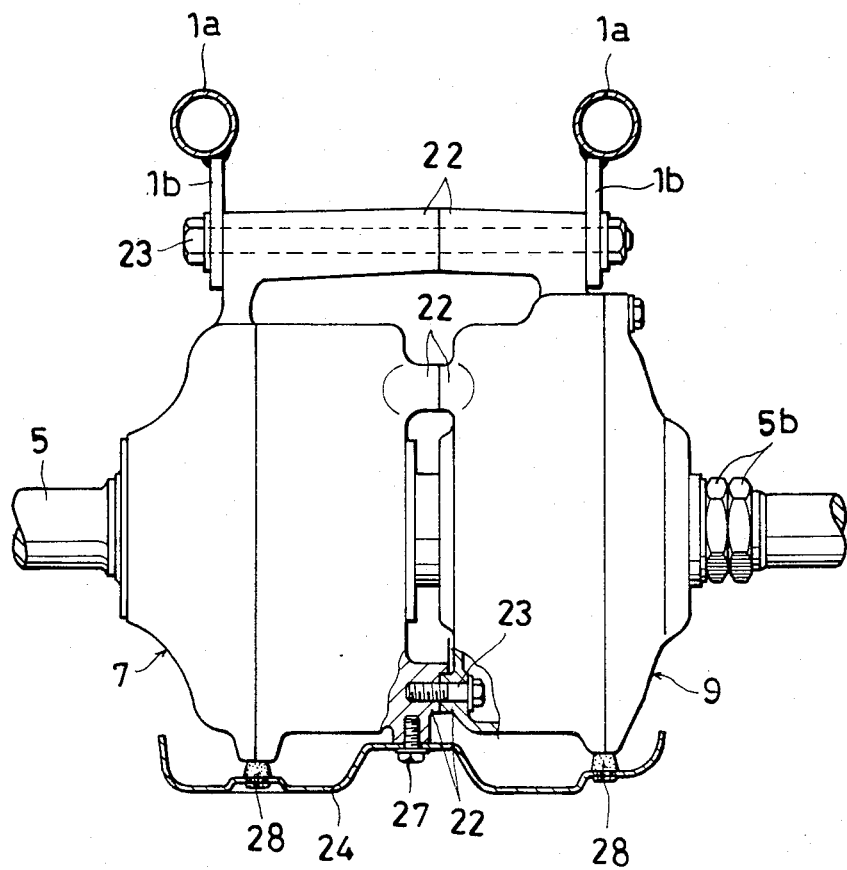
FIG. 4 is an enlarged rear view of the same.

The assembling process thereof will be explained as described below. Namely, as shown clearly in FIGS. 3 and 4, the two upper and lower abutment portions 22, 22 formed at forward side portions of the two casings 7, 9 are prepared for use as attached base portions for attaching to the vehicle 1 side and are adapted to be insertable between the two brackets 1b, 1b. At the remainder abutment portions 22, 22 ... , the two casings 7, 9 are jointed together to become an integral assembly. This assembly is thereafter inserted at each of the foregoing two upper and lower abutment portions 22, 22 serving as the attaching base portions into a lateral space between the pair of brackets 1b, 1b. A through bolt piercing through the two brackets 1b, 1b is used for the fastening bolt 23 to be applied to each abutment portion 22, and thus each of the abutment portions 22, 22 is fixed to the two brackets 1b, 1b.

The rear wheel axle 5 is arranged so that it may be detachably inserted through the two casings 7, 9 from one side while the two casings 7, 9 remain attached to the vehicle body 1 as mentioned above. Namely, the rear wheel axle 5 is inserted from the transmission casing 7 side, and passes through the ring gear 12 in the casing 7 and the brake drum 15 and the ring 19 in the brake casing 19. An engaging shoulder 5a formed on the rear wheel axle 5 is brought into engagement with an end surface of the foregoing spline sleeve 12a formed on one side of the ring gear 12. At the same time the collar 9 is fastened by nuts 5b applied to the outwardly protruded end portion of the rear wheel axle 5, so that the rear wheel axle 5 is supported by the two casings 7, 9 so that it cannot move in the axial direction thereof. However, the rear wheel axle 5 can be pulled out if the nuts 5b are removed.

Thus, the rear wheel axle 5 is facilitated in deassembly ing and assemblying for checking or repairing of the apparatus. Thus, the apparatus is improved for maintenance.

Referring to the drawings, a skid plate 24 is provided below the disposed portion of the two casings 7, 9. A front end portion of the plate 24 is attached at its both lateral side portions to front end portions of the rear frame pipes 1a, 1a by bolts 25. A middle portion of the plate 24 is attached at its both lateral side portion to the brackets 1b, 1b by bolts 26. Additionally, in order that a rear portion of the plate 24 may have its supporting strength increased and also may be prevented from being deformed by vibrations or a pushing force acting from below, a center portion in the lateral width of the rear portion of the plate 24 is fixed to either of the two casings 7, 9 by bolts 27. Additionally, both lateral side portions of the center portion thereof are in abutment with the respective casings 7, 9 through resilient stoppers 28, 28.

Referring to the drawings, a trailer hitch 29 having a hitch ball 29a can be provided. The abutment portions 22, 22 formed on the rearward portions of the two casings 7, 9 are also used as attaching base portions for attaching the hitch 29. The hitch 29 and the base portions are fastened together by a pair of upper and lower fastening bolts 23, 23 applied thereto.

Thus, according to this invention, the transmission casing and the brake casing provided around the axis of the rear wheel axle are disposed side by side as to leave a space therebetween, and are combined together at circumferentially arranged plural positions, so that the two casings can be prepared in the form of an integral assembly. Consequently, attaching of the assembly to the vehicle body can be facilitated. In addition, because the space formed between the two casings, the heat generated in the brake casing can be prevented from being transmitted to the transmission casing side. Thus the lubricant for the final driving mechanism in the transmission casing can be prevented from being deteriorated. Additionally, by the action of a driving air flowing through the space, the cooling of the driving mechanism in the transmission casing and the brake mechanism in the brake casing can be increased.

It is readily apparent that the above-described apparatus for attaching a transmission casing and a brake casing in a motorized three-wheeled vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for attaching a transmission casing and a brake casing in a motorized three-wheeled vehicle having a rear wheel axle interconnecting between a pair of right and left rear wheels, a transmission casing housing a final stage driving mechanism, a brake casing housing a brake mechanism provided around the axis of the axle, characterized in that the transmission casing and the brake casing are composed of respective sealed casings, the two casings are disposed side by side leaving a space therebetween, and are combined together at circumferentially arranged plural positions with plural fastening bolts said two casings being connected to said vehicle and supporting said axle.

2. The apparatus of claim 1, wherein the two casings are fixed to a vehicle body of the motorized three-wheeled vehicle by utilizing at least one of the fastening bolts for combining two casings together.

3. The apparatus of claim 1, wherein said transmission casing has mounted therein coaxially of the axle axis left and right bearings and left and right oil seals outside of said bearings, and said final stage driving mechanism comprises a bevel gear splined to said axle and having spline sleeves projecting at both sides thereof through and supported by said bearings and through and sealed by said oil seals, and a pinion gear extending perpendicularly of said axle engaging said bevel gear.

4. An apparatus for attaching a transmission casing and a brake casing in a motorized three-wheeled vehicle having a rear wheel axle interconnecting between a pair of right and left rear wheels, a transmission casing housing a final stage driving mechanism, a brake casing housing a brake mechanism provided around the axis of the axle, characterized in that the transmission casing and the brake casing are composed of respective sealed casings, the two casings being disposed side by side leaving a space therebetween, and are combined together at circumferentially arranged plural positions with plural fastening means, said brake casing having mounted therein coaxially of said axle a right side bearing and left and right dust seals, said brake mechanism comprising a brake drum splined to said axle and having a sleeve extending from one side thereof through and supported by said left dust seal, brake shoes inside of said drum arranged to be brought into contact with said drum, a brake cam rotatably mounted in said brake casing arranged to cam said shoes into contact with said drum, means for rotating said brake cam, and means extending through and supported by said right bearing and said right dust seal for holding said drum in axial position.

* * * * *

UNITED STATES PATENT AND TRADEMARK OFFICE
CERTIFICATE OF CORRECTION

PATENT NO. : 4,534,440
DATED : August 13, 1985
INVENTOR(S) : SATOSHI SEKIZAKI ET AL It is certified that error appears in the above-identified patent and that said Letters Patent is hereby corrected as shown below:

On the cover page, Item [75], change "Toyama" to --- Tokyo ---; and change "Hotoyuki Takasu," to --- Hitoyuki Takasu, ---.

Signed and Sealed this

Twenty-fourth Day of June 1986

[SEAL]

Attest:

DONALD J. QUIGG

Attesting Officer

Commissioner of Patents and Trademarks